Nov. 14, 1933.　　B. M. VAN DERHOFF　　1,934,895
GEAR SHIFTING MECHANISM
Filed Dec. 28, 1931　　3 Sheets-Sheet 1

INVENTOR
Bern M. VanDerhoff,
BY George D. Richards
ATTORNEY

Nov. 14, 1933.   B. M. VAN DERHOFF   1,934,895
GEAR SHIFTING MECHANISM
Filed Dec. 28, 1931   3 Sheets-Sheet 2
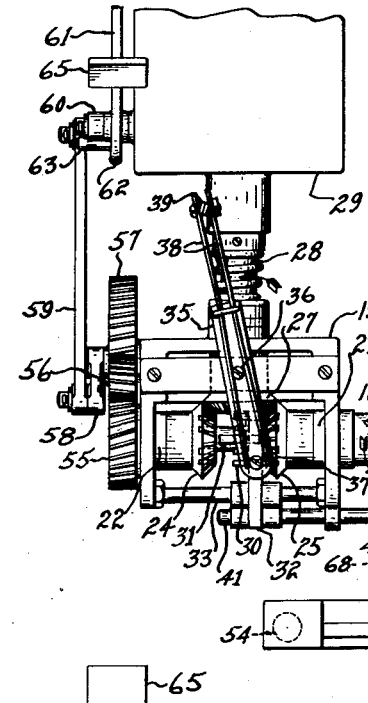
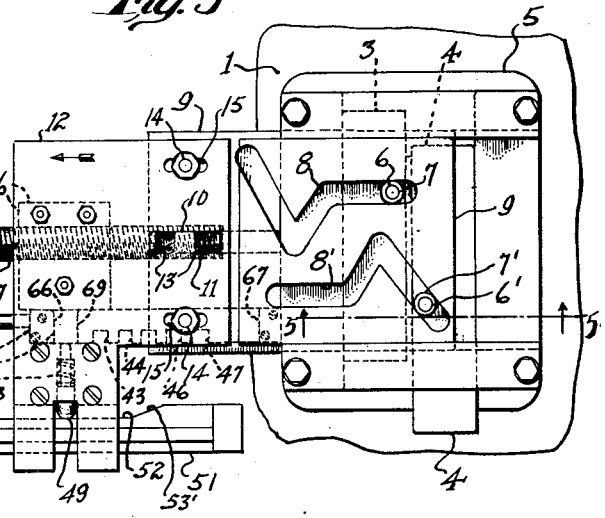
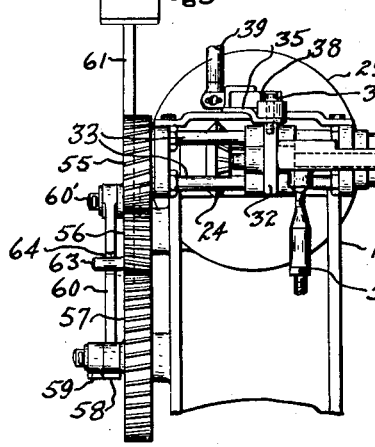
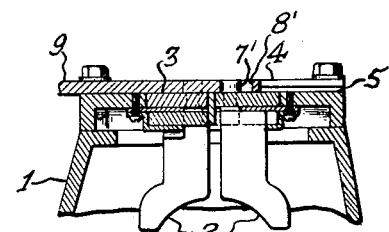
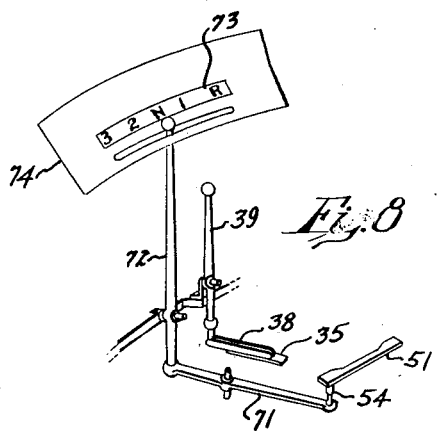
INVENTOR
Bern M. VanDerhoff,
BY
George D. Richards
ATTORNEY Nov. 14, 1933.  B. M. VAN DERHOFF  1,934,895
GEAR SHIFTING MECHANISM
Filed Dec. 28, 1931   3 Sheets-Sheet 3
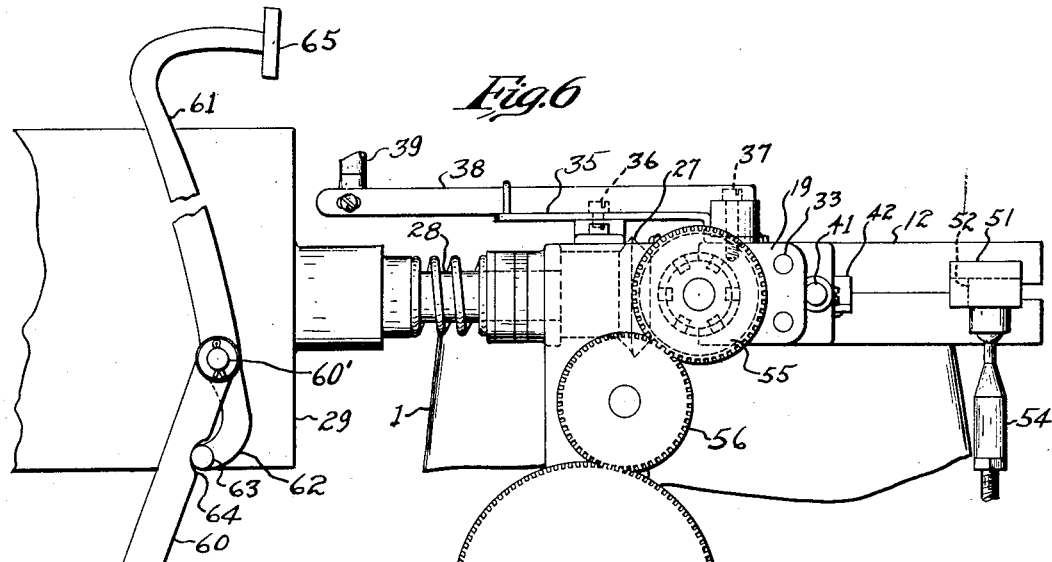
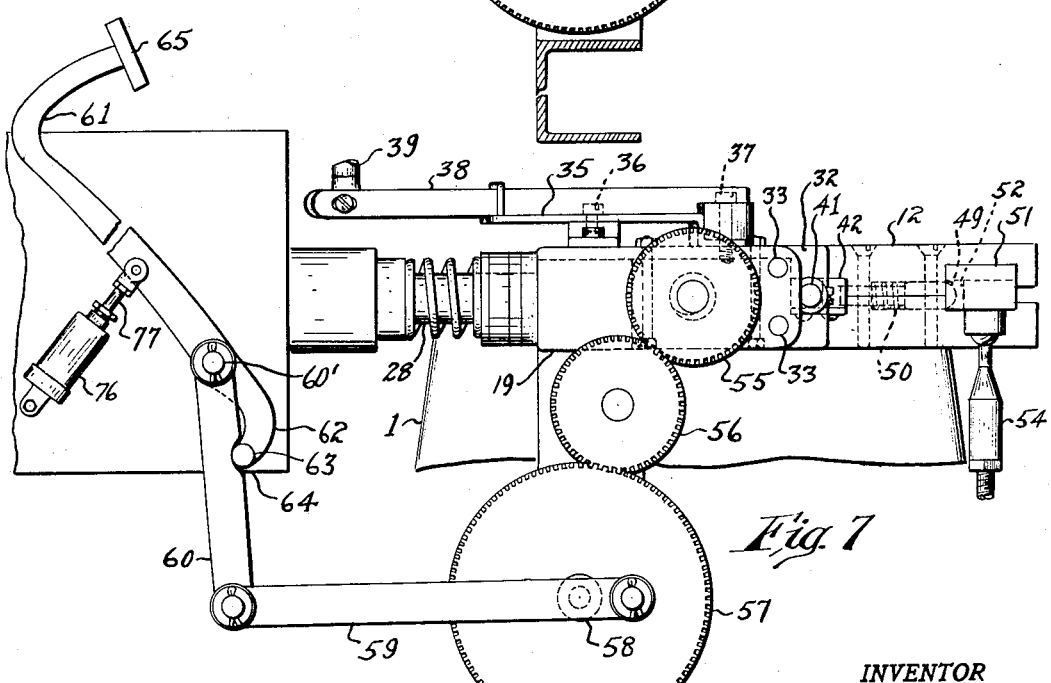
INVENTOR
Bern M. Vanderhoff,
BY
George D. Richards
ATTORNEY Patented Nov. 14, 1933

1,934,895

UNITED STATES PATENT OFFICE 1,934,895

GEAR SHIFTING MECHANISM

Bern M. Van Derhoff, Newark, N. J.

Application December 28, 1931. Serial No. 583,477

6 Claims. (Cl. 74—59)

This invention relates, generally, to the shifting of gears such as those occurring in the transmissions of automobiles and the like; and the invention has reference, more particularly, to a novel gear shifting mechanism which is adapted to relieve the machine operator of the manual effort required to shift gears.

Heretofore, in shifting gears on automotive vehicles to obtain various speeds, it has been necessary for the machine operator to manually shift the gears as by means of a gear shift lever, while at the same time it has been necessary for the operator to operate the clutch in synchronism with the gear shifting operations. These dual operations, namely, that of shifting the gears and operating the clutch, require considerable skill and even experienced operators ofttimes clash the gears of the transmission owing to their failure to properly time the shifting operations with respect to the operations of the clutch and the speed of the vehicle and engine.

The principal object of the present invention is to provide a novel gear shifting mechanism which, when installed in an automotive vehicle or the like, is adapted to relieve the machine operator of the necessity of manually shifting the gears as well as operating the clutch.

Another object of the present invention lies in the provision of a novel gear shifting mechanism which is of simple construction and which is adapted to be set in operation to effect any desired speed change by the mere simple and easy movement of one or two control levers.

Another object of the present invention is to provide a novel gear shifting mechanism which is adapted to operate the clutch and the gear shift in such timed sequence that gear clashing is eliminated and all shifting is done with the maximum possible speed taking into consideration the engine speed at any particular time.

Other objects of this invention, not at this time more particularly enumerated, will be clearly understood from the following detailed description of the same.

The invention is clearly illustrated in the accompanying drawings, in which:

Fig. 3 is a view similar to Fig. 1 but illustrates the gear shifting mechanism operating to shift the gears into reverse position.

Fig. 4 is a view in elevation of the structure shown in Fig. 3.

Fig. 5 is a sectional view taken substantially along line 5—5 of Fig. 3.

Fig. 6 is a somewhat enlarged view looking at the left side of the structure shown in Fig. 1.

Fig. 7 is a somewhat enlarged view looking at the left side of the structure shown in Fig. 2; and Fig. 8 is a fragmentary, schematic perspective view illustrating a typical lever arrangement for operating the gear shifting mechanism of this invention.

Similar characters of reference are employed in all of the above described views to indicate corresponding parts.

Figure 1:
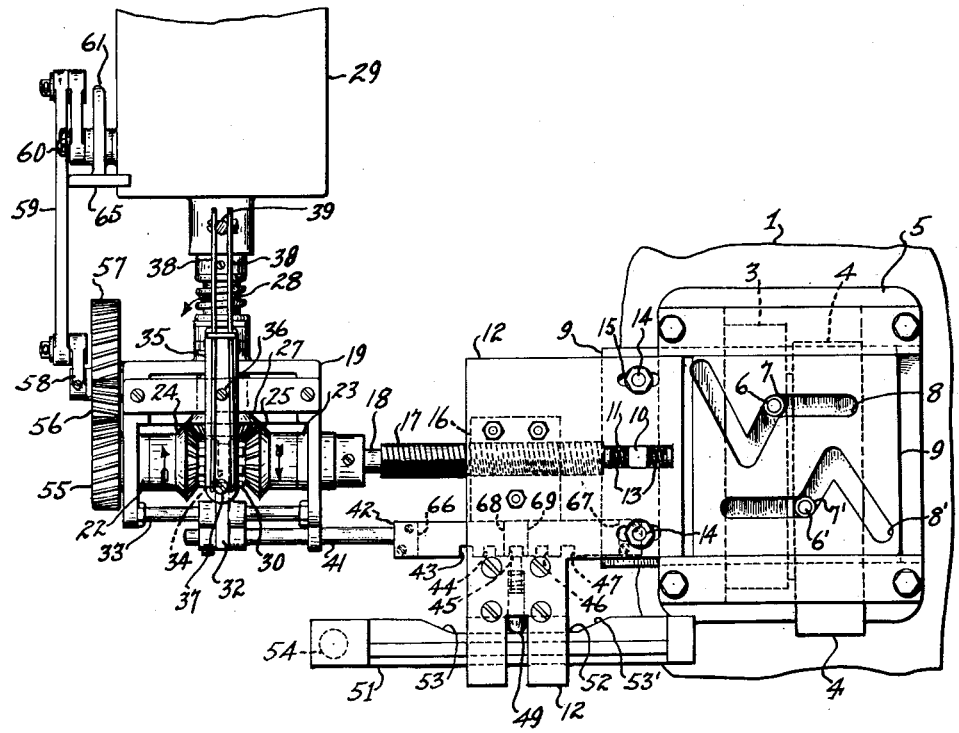
Fig. 1 is a plan view with parts broken away of the novel gear shifting mechanism of the present invention applied to an automobile vehicle, the said mechanism being shown with the gear shift in neutral position.

Referring now to the said drawings, the reference numeral 1 designates the transmission housing of an automotive vehicle equipped with the novel gear shifting mechanism of this invention. The transmission housing 1 is provided with the usual pair of shifting forks 2 therewithin. Shifting forks 2 are respectively connected to slide plates 3 and 4 which are mounted for reciprocating movement, longitudinally of the vehicle, within a transmission cover member 5. The slide plate 3 has a pin 6 extending upwardly therefrom, which pin carries a roller 7 that rides within a cam slot 8 provided in a transversely movable cam plate 9.

Cam plate 9 is guided in its transverse movements by suitable guides formed in the transmission cover member 5. The slide plate 4 has a pin 6' extending upwardly therefrom, which pin carries a roller 7' that rides within a cam slot 8' provided in the cam plate 9. The cam slots 8 and 8' of cam plate 9 are of such shape as to cause the proper shifting movements of the shifting forks 2 as this cam plate is moved transversely of the transmission cover member 5. The cam plate 9 is provided with an upwardly extending projection or abutment 10 which extends into a transverse slot 11 provided in a yoke member 12.

Coil compression springs 13 are contained within slot 11 at the sides of projection 10 and serve to resiliently transmit driving force from the yoke member 12 to the projection 10. The cam plate 9 is illustrated as provided with vertical studs 14 which project through transverse guide slots 15 provided in the yoke member 12. Studs 14 operating within the slots 15 serve in conjunction with projection 10 to maintain yoke member 12 in transverse alignment with the cam plate 9 while permitting limited transverse movement of the yoke member with respect to the cam plate, such limited relative transverse movement being possible by compressing the springs 13. Yoke member 12 has a nut or depending projection 16 fixed to the under-surface thereof, which nut is provided with a threaded, transverse aperture for receiving the threaded portion 17 of an operating shaft 18. Operating shaft 18 extends transversely through a frame member 19 and is turnably mounted in bearings 22 and 23 provided in this frame member.

Spaced bevel gears 24 and 25 are turnably mounted on the operating shaft 18 adjacent bearings 22 and 23 respectively. Bevel gears 24 and 25 are a part of cooperating gearing having a third bevel gear 27 meshing with gears 24 and 25. Bevel gear 27 is fixed on a drive shaft 28, which drive shaft extends into the rear portion of the engine housing 29 and is suitably driven from the engine as by means of gearing (not shown) connecting the same to the cam shaft, for example, of the engine. During the operation of the engine, drive shaft 28 is continuously operated at a moderate speed and serves to continuously rotate the bevel gears 24 and 25.

A double acting square-jawed clutch 30 is splined as by means of a key 31 to the drive shaft 18 intermediate the two bevel gears 24 and 25. The jaws of clutch 30 are adapted to cooperate with conforming recesses formed in the gears 24 and 25, whereby the rotative movement of either of these gears may be selectively transmitted to the drive shaft 18. A shifting fork 32 is slidably mounted on transverse rods 33 carried by the frame member 19. Shifting fork 32 engages in an annular groove 34 provided in the clutch 30 for effecting the shifting of this clutch while permitting rotative movement thereof.

A lever 35 is pivoted at 36 upon frame member 19 and is pivotally connected at 37 to the shifting fork 32. Lever 35 is provided with a resilient arm consisting of spring leaves 38 which resilient arm is adapted to be actuated by means of a suitable lever or lever system 39 (see Fig. 8) connected to the forward ends of spring leaves 38, which lever or lever system 39 extends to a point within convenient reach of the machine operator. Thus, by shifting lever 39, as shown in Fig. 8, to the left, the lever 35 is moved to the right as shown in Fig. 2 to effect the engagement of clutch 30 with bevel gear 24, whereas, if lever 39 is shifted to the right, the clutch 30 is caused to engage bevel gear 25, as shown in Fig. 3. When lever 39 and lever 35 are in their intermediate positions shown in Figs. 1 and 8, the double acting square-jawed clutch 30 does not engage either of the gears 24 or 25, and hence no drive takes place between drive shaft 28 and operating shaft 18.

Shifting fork 32 has one end portion of a transverse shift rod 41 secured thereto. The other end portion of shift rod 41 is secured to a transversely extending rack plate 42. Rack plate 42 is mounted for transverse sliding movement in a guide aperture provided in the yoke 12. Rack plate 42 has five longitudinally spaced notches 43, 44, 45, 46 and 47 therein. Notches 43 to 47 are adapted to be selectively engaged by the inner end portion of a stop pin 49 that is slidably mounted in an aperture provided in an extension of the yoke member 12. A compression spring 50 surrounds the intermediate portion of stop pin 49 and tends to urge this pin outwardly so as not to engage in the recesses 43 to 47. The outer end of stop pin 49 is pressed by spring 50 into engagement with a slide rod 51 which is slidably mounted in a suitable transverse slide bearing aperture provided in the yoke member 12. The outer end of stop pin 49 engages a recessed intermediate portion 52 provided in slide rod 51, which recessed portion has beveled end walls 53 and 53'.

With the outer end of stop pin 49 engaging within the recessed portion 52 of the slide rod, the inner end of pin 49 does not engage in any of the notches 43 to 47 of rack plate 42. However, when the stop pin 49 is urged inwardly against the tension of compression spring 50 by either of the beveled end walls 53 or 53', the inner end portion of this stop pin is caused to engage in a selected one of the recesses 43 to 47. Slide rod 51 is adapted to be manipulated by a suitable lever system such as lever system 71—72 of Fig. 8 shown connected to a link 54 attached to the slide rod 51, which lever system extends to a point within convenient reach of the machine operator. In Fig. 8 of the drawings the upper end of lever 72 is shown as movable along a scale 73 mounted on the dash 74, on which scale is marked the several vehicle speeds, including neutral and reverse. The machine operator therefor by manipulating such lever system, may shift the slide rod 51 transversely in either direction so as to cause either the beveled end wall 53 or the beveled end wall 53' to engage the outer end of stop pin 49 at the proper time to effect the engagement of the inner end portion of this pin with a selected one of the notches 43 to 47. The rack plate 42 is provided at its ends with depending stop lugs 66 and 67, respectively, which are adapted to engage stop shoulders 68 and 69, respectively, provided on the yoke member 12.

The free end portion of operating shaft 18 has a pinion 55 fixed thereon adjacent the frame member 19. Pinion 55 operates through an idler gear 56 to drive a gear 57 (see especially Figs. 6 and 7). Gear 57 has a crank arm 58 secured thereto, which crank arm is pivotally connected to one end portion of a link 59. The other end portion of link 59 is pivotally connected to the lower end portion of a depending link 60, the upper end portion of which link 60 is pivoted upon the clutch shaft 60'. Clutch lever 61 is illustrated as provided with a lower offset portion 62 below shaft 60', which offset portion has a projection 63 formed thereon. Projection 63 cooperates with a notch 64 provided in link 60. By manually pressing downwardly upon the clutch pedal 65, the clutch lever 61 may be actuated to disengage the vehicle clutch at any time without interference from the links 60 or 59. On the other hand, the turning of gear 57 by rotating the operating shaft 18, will cause movement of links 59 and 60 so that link 60, acting upon the projection 63, serves to effect the disengagement of the vehicle clutch.

Figure 2:
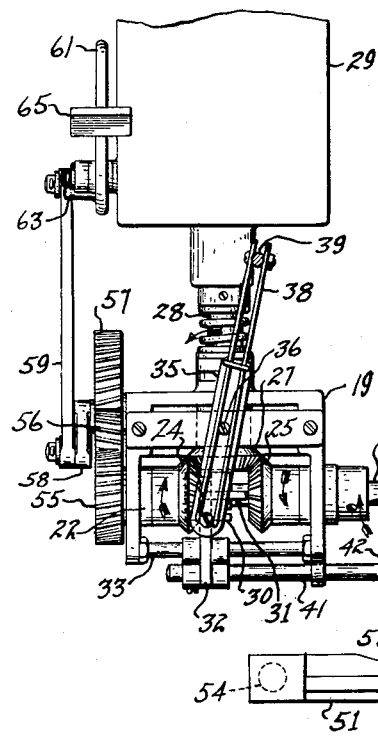
Fig. 2 is a view similar to Fig. 1 but illustrates the gear shifting mechanism operating to shift the gears into intermediate or second speed position.
Figure 2:
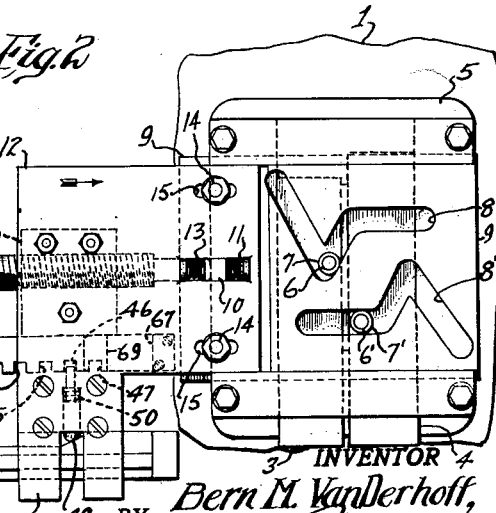

In operation, if it be assumed that the vehicle transmission is in neutral position, the several parts of the apparatus will be in the positions shown in Figs. 1, 6 and 8. The double acting square-jawed clutch 30 is now in its intermediate or neutral position, whereby the rotative movement of drive shaft 28 is not transmitted to operating shaft 18. The vehicle clutch is engaged at this time. Assume that it is now desired to shift the vehicle transmission directly to second or intermediate speed. To accomplish this result, the lever system 71—72 connected to slide rod 51 is moved so that the upper end of lever 72 is positioned opposite the figure 2 of scale 73, causing the slide rod 51 to move somewhat toward the left in Fig. 1 or into the position in Fig. 2. Lever 39 is now actuated so as to cause the clutch 30 to engage bevel gear 24 as shown in Fig. 2. Assuming the drive shaft 28 to be rotating in the direction shown by the arrow in Fig. 2, the engagement of clutch 30 with gear 24 will cause the operating shaft 18 to revolve in the direction shown by the arrows in Fig. 2, thereby causing yoke member 12 to move towards the right, as shown by the arrow in this figure. As yoke member 12 commences to move toward the right, it acts through compression springs 13 and projection 10 to move the cam plate 9 also toward the right. As cam plate 9 moves toward the right, it causes rollers 7 and 7' to ride in the cam slots 8 and 8', thereby effecting the shifting of slide plates 3 and 4 together with shifting forks 2 to cause the desired shifting of the transmission gears. Owing to the presence of the compression springs 13, the drive between yoke member 12 and cam plate 9 is cushioned so as to facilitate the movement of rollers 7 and 7' along their respective slots 8 and 8'. As the yoke member 12 moves along it moves over the stationary rack plate 42 and causes the outer end of stop pin 49 to slide over the recess portion 52 of the slide rod 51.

Just before the rollers 7 and 7' have reached their second or intermediate speed positions as shown in Fig. 2, the outer end portion of stop pin 49 engages the beveled end 53' of slide rod 51, causing the inner end portion of this stop pin to enter the notch 46 of the rack 42. Continued movement of the yoke member 12 thereafter causes rack plate 42 to move also, effecting movement of the square-jawed clutch 30 away from bevel gear 24 so that just as the rollers 7 and 7' reach positions corresponding to second speed, the moving rack plate 42 will have effected the disengagement of clutch 30 from bevel gear 24, thereby breaking the drive to operating shaft 18 and stopping the movement of the shifting mechanism. During the movement of the shifting mechanism to effect the engagement of the transmission gears in second speed position, the operating shaft 18 turned pinion 55, causing rotation of gear 57 to effect the disengagement of the vehicle clutch, as shown in Fig. 7, prior to the meshing of the gears in second speed. Just as the gears become completely meshed, the gear 57 moves again into the position shown in Fig. 6, thereby causing the reengagement of the vehicle clutch. The vehicle is now operating in second speed.

Assuming that it is now desired to operate the vehicle in reverse, the lever 39 is moved to the right as shown in Fig. 8, causing lever 35 to move to the left as shown in Fig. 3 and effecting the engagement of clutch 30 with pinion 25. The operating shaft 18 now commences to revolve in the opposite direction to that previously described, causing yoke member 12 to move toward the left, as shown in Fig. 3 and effecting movement of cam plate 9. The rollers 7 and 7' now move along cam slots 8 and 8' causing the transmission gears to move through the several positions lying between second speed and reverse. Each time the gears pass into mesh, the vehicle clutch is operated by gear 57 to disengage the drive to the vehicle wheels and as the gears become completely meshed the vehicle clutch is engaged for a time. As the rollers 7 and 7' approach the reverse speed position, as shown in Fig. 3, the stop lug 66 on rack plate 42 engages stop shoulder 68 on the yoke member 12, so that further movement of the yoke member 12 causes the rack plate 42 to move towards the left, as viewed in Fig. 3, effecting movement of clutch 30 away from the bevel gear 25.

Just as rollers 7 and 7' reach the positions corresponding to reverse speed of the transmission gears, the clutch 30 will have disengaged gear 25, thereby ending the drive of operating shaft 18 and causing the several parts of the mechanism to come to rest with the vehicle gears in reverse speed. When going into reverse it is unnecessary to move the lever 72 controlling slide rod 51, because the stop lug 66 by engaging stop shoulder 68 serves to effect the shifting of the shifting forks 32 at the proper time. Likewise, in the event that it is desired to operate the vehicle in high speed or third speed, the lever 39 is thrown to the left as shown in Fig. 8, causing the clutch 30 to engage bevel gear 24, whereupon the gear shifting mechanism will pass through the various speeds and finally bring the machine into third speed at which time stop lug 67 by engaging stop shoulder 69 effects the disengagement of clutch 30 from gear 24. Drive shaft 28 is so geared to the engine cam shaft or other driving part that the vehicle will remain for a desired time in each successive speed as the mechanism passes through such speed.

It will thus be noted that by a simple manipulation of lever 39 the vehicle operator may bring the vehicle from intermediate or low speed or from neutral into either high speed or reverse and by manipulating both levers 39 and 72 he may bring the vehicle into either low or intermediate speed. If desired, a single acting liquid check cylinder 76 may be connected to the engine casing 29 and its piston 77 connected to clutch lever 61 as shown in Fig. 7, to effect the slowing up of the motion of this lever during the engaging movement of the clutch. This liquid check cylinder 76 would not affect the rapid disengagement of the clutch by lever system 59—60.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

What is claimed is:

1. A gear shifting mechanism for shifting the transmission gears of a vehicle comprising, gearing arranged to be driven from the vehicle engine, manually operable lever mechanism connected to said gearing, an operating shaft arranged to be driven from said gearing, a yoke member threaded upon said operating shaft, a cam plate resiliently connected to said yoke member, said cam plate having cam slots therein, slide members mounted on the vehicle transmission for operating the gears thereof, said slide members having rollers engaged in said cam slots, whereby actuation of said cam plate by said yoke member, moving under the driving action of said operating shaft, effects shifting movements of the transmission gears.

2. A gear shifting mechanism for shifting the transmission gears of a vehicle and for operating the vehicle clutch comprising, bevel gearing arranged to be driven from the vehicle engine, manually operable lever mechanisms connected to said bevel gearing, an operating shaft arranged to be driven from said bevel gearing, a yoke member threaded upon said operating shaft, a cam plate connected to said yoke member, said cam plate having cam slots therein, slide members mounted on the vehicle transmission for operating the gears thereof, said slide members having rollers engaged in said cam slots, whereby actuation of said cam plate by said yoke member, moving under the driving action of said operating shaft, effects shifting movements of the transmission gears, gearing driven by said operating shaft, and lever mechanism connected to the vehicle clutch and actuated by said gearing for effecting the shifting of the vehicle clutch in proper timed sequence with the shifting of the transmission gears.

3. A gear shifting mechanism for shifting the transmission gears of a vehicle comprising, a drive shaft arranged to be driven from the vehicle engine, a beveled gear connected to said drive shaft, an operating shaft disposed at right angles to said drive shaft, a pair of beveled gears rotatably mounted on said operating shaft and meshing with said first mentioned beveled gear, a clutch for selectively connecting each of said pair of beveled gears in driving relation to said operating shaft, whereby said operating shaft may be selectively rotated in either direction, manually operable lever mechanism for shifting said clutch, a yoke member threaded upon said operating shaft, and cam means driven by said yoke member for effecting the shifting of the vehicle transmission gears.

4. A gear shifting mechanism for shifting the transmission gears of a vehicle comprising, a drive shaft arranged to be driven from the vehicle engine, a beveled gear connected to said drive shaft, an operating shaft disposed at right angles to said drive shaft, a pair of beveled gears rotatably mounted on said operating shaft and meshing with said first mentioned beveled gear, a clutch for selectively connecting each of said pair of beveled gears in driving relation to said operating shaft, whereby said operating shaft may be selectively rotated in either direction, manually operating lever mechanism for shifting said clutch, a yoke member threaded upon said operating shaft to be driven by the latter, cam means driven by said yoke member for effecting the shifting of the vehicle transmission gears, a shift rod for effecting the disengagement of said clutch, and means connected to said shift rod and arranged for actuation by said yoke member to effect the disengagement of said clutch upon the completion of a desired gear shifting movement of said cam means.

5. A gearing shifting mechanism for shifting the transmission gears of a vehicle comprising, a drive shaft arranged to be driven from the vehicle engine, a beveled gear connected to said drive shaft, an operating shaft disposed at right angles to said drive shaft, a pair of beveled gears rotatably mounted on said operating shaft and meshing with said first mentioned beveled gear, a clutch for selectively connecting each of said pair of beveled gears to said operating shaft, whereby said operating shaft may be selectively rotated in either direction, manually operable lever mechanism for shifting said clutch, a yoke member threaded upon said operating shaft and driven by the latter, cam means driven by said yoke member for effecting the shifting of the vehicle transmission gears, a shift rod, a rack plate secured to said shift rod, a stop pin carried by said yoke member and adapted to engage said rack plate to cause movement of said shift rod and effect disengagement of said clutch, and a manually operable slide rod cooperating with said stop pin for causing the engagement of said pin with said rack plate.

6. A gear shifting mechanism for shifting the transmission gears of a vehicle and for operating the vehicle clutch comprising, a drive shaft arranged to be driven from the vehicle engine, a beveled gear connected to said drive shaft, an operating shaft disposed at right angles to said drive shaft, a pair of beveled gears rotatably mounted on said operating shaft and meshing with said first mentioned beveled gear, a clutch for selectively connecting each of said pair of beveled gears to said operating shaft, whereby said operating shaft may be selectively rotated in either direction, manually operable lever mechanism for operating said clutch, a yoke member threaded upon said operating shaft and driven by the latter, cam means driven by said yoke member for effecting the shifting of the transmission gears, a shift rod, a rack plate secured to said shift rod, a stop pin carried by said yoke member and adapted to engage said rack plate to cause movement of said shift rod and effect disengagement of said clutch, a manually operable slide rod cooperating with said stop pin for causing the engagement of said pin with said rack plate, gearing driven by said operating shaft and connected to the vehicle clutch for operating the vehicle clutch in proper timed sequence with the shifting of the transmission gears by said cam means.

BERN M. VAN DERHOFF.